US008752134B2

(12) United States Patent
Ma et al.

(10) Patent No.: US 8,752,134 B2
(45) Date of Patent: Jun. 10, 2014

(54) SYSTEM AND METHOD FOR DETECTING AND PREVENTING ATTACKS AGAINST A SERVER IN A COMPUTER NETWORK

(76) Inventors: Jie Ma, Beijing (CN); Jinghui Feng, Beijing (CN)

( * ) Notice: Subject to any disclaimer, the term of this patent is extended or adjusted under 35 U.S.C. 154(b) by 0 days.

(21) Appl. No.: 13/501,301

(22) PCT Filed: Mar. 5, 2012

(86) PCT No.: PCT/CN2012/071949
§ 371 (c)(1),
(2), (4) Date: Apr. 11, 2012

(87) PCT Pub. No.: WO2013/131237
PCT Pub. Date: Sep. 12, 2013

(65) Prior Publication Data
US 2013/0232545 A1    Sep. 5, 2013

(51) Int. Cl.
*G06F 21/00* (2013.01)
(52) U.S. Cl.
USPC ............... 726/3; 726/12; 726/25; 709/202; 709/219
(58) Field of Classification Search
USPC ........ 726/1–4, 22–25, 12; 709/203, 224, 219, 709/202
See application file for complete search history.

(56) References Cited

U.S. PATENT DOCUMENTS

| 6,810,417 | B2 | 10/2004 | Lee |
| 7,506,102 | B2 | 3/2009 | Lev-Ran et al. |
| 7,571,217 | B1 * | 8/2009 | Saxena ........................ 709/217 |
| 8,112,471 | B2 * | 2/2012 | Wei et al. ...................... 709/202 |
| 2003/0212904 | A1 * | 11/2003 | Randle et al. ................ 713/200 |
| 2004/0044731 | A1 * | 3/2004 | Chen et al. .................... 709/203 |
| 2006/0015472 | A1 * | 1/2006 | Ahlander et al. ................. 707/1 |
| 2008/0104198 | A1 * | 5/2008 | Kamath et al. ............... 709/217 |
| 2008/0320567 | A1 * | 12/2008 | Shulman et al. .................. 726/4 |
| 2009/0007102 | A1 * | 1/2009 | Dadhia et al. .................... 718/1 |

(Continued)

FOREIGN PATENT DOCUMENTS

| CN | 101034977 A | 9/2007 |
| CN | 101119385 A | 2/2008 |
| CN | 101183415 A | 5/2008 |

OTHER PUBLICATIONS

Jayamsakthi Shanmugam et al, XSS Application Worms: New Internet Infestation and Optimized Protective Measures, pp. 1164-1169, Eighth ACIS International Conference, IEEE, 2007.*

(Continued)

*Primary Examiner* — David Garcia Cervetti
*Assistant Examiner* — Shanto M Abedin
(74) *Attorney, Agent, or Firm* — Morgan, Lewis & Bockius LLP

(57) ABSTRACT

The present invention provides a computer-implemented method, performed by a server system having one or more servers and memory storing one or more programs for execution by the one or more servers, the method comprising at the server system: receiving an access request to a network server from a terminal device; determining whether the access request matches a cached record stored in an substitute server; if the cached record is found, returning the cached record to the terminal device; if no cached record is found, processing the access request for security check; forwarding the processed access request to the network server; receiving a response from the network server; optimizing the response from the network server; and forwarding the optimized response to the terminal device.

14 Claims, 3 Drawing Sheets

(56) References Cited

U.S. PATENT DOCUMENTS

| | | | |
|---|---|---|---|
| 2009/0024698 A1* | 1/2009 | Ho et al. | 709/203 |
| 2010/0146291 A1* | 6/2010 | Anbuselvan | 713/189 |
| 2010/0299735 A1* | 11/2010 | Jiang | 726/7 |
| 2010/0312821 A1* | 12/2010 | Bannoura et al. | 709/203 |
| 2011/0231482 A1* | 9/2011 | Benna | 709/203 |
| 2012/0297478 A1* | 11/2012 | Martin et al. | 726/22 |

OTHER PUBLICATIONS

David Scott et al, Abstracting Application-Level Web Security, ACM, 2002.*

Xingyunrongchuang (Beijing) Info. Tech. Co. Ltd., et al., International Search Report, PCT/CN2012/071949, Dec. 2012, 13 pgs.

* cited by examiner

SYSTEM AND METHOD FOR DETECTING AND PREVENTING ATTACKS AGAINST A SERVER IN A COMPUTER NETWORK

The present application is a national stage of PCT International Application No. PCT/CN2012/071949, filed Mar. 5, 2012.

TECHNICAL FIELD

The present invention relates generally to the field of data exchange in a computer network, and in particular, to a system and method for improving the network security during data exchange using a substitute server system to detect and prevent malicious attacks to a network server based on a set of protection rules.

BACKGROUND

A computer network (e.g., Internet) involves data exchange between a terminal device (e.g., a laptop, a tablet computer, or a smart phone) and a network server (e.g., a web server). The terminal device sends out an access request to access a piece of day (e.g., a web page) hosted by the network server. A domain name sever (DNS) receives the access request, determines the internet protocol (IP) address of the network server, and forwards the access request to the network server. The network server returns information of the accessed web page to the terminal device upon receiving the access request. In many cases, the source code of the web page may have security loopholes due to, e.g., lack of experience of the person who develops the source code. As such, the network server may be vulnerable to malicious attacks.

SUMMARY OF DISCLOSED EMBODIMENT

According to some embodiment, a computer-implemented method, performed by a server system having one or more servers and memory storing one or more programs for execution by the one or more servers, the method comprises at the server system, receiving an access request to a network server from a terminal device; determining whether the access request matches a cached record stored in an substitute server; if the cached record is found, returning the cached record to the terminal device; if no cached record is found, processing the access request for security check; forwarding the processed access request to the network server; receiving a response from the network server; optimizing the response from the network server; and forwarding the optimized response to the terminal device.

According to some embodiment, the substitute server extracts a web page address from the access request, and compares the web page address with the cached records stored in the substitute server.

According to some embodiment, the security check further comprises detecting whether the access request includes an illegal access request.

According to some embodiment, the security check further comprises detecting whether the access request includes a Structured Query Language (SQL) injection.

According to some embodiment, the security check further comprises detecting whether the access request includes a Cross Site Scripting (XSS).

According to some embodiment, the step of optimizing the response further comprises configuring a Time To Live (TTL) for a web page maintained in the network server; if the TTL of the webpage is shorter than one week, configuring the TTL of the web page to one week by default.

According to some embodiment, the step of optimizing the response further comprises deferring the loading of a JavaScript that does not affect web page rendering.

According to some embodiment, the step of optimizing the response further comprises compressing Cascading Style Sheets (CSS)/JavaScript, and adjusting positions of CSS and JavaScript.

According to some embodiment, the step of optimizing the response further comprises compressing an image without loss, and normalizing the size of an image.

According to some embodiment, the step of optimizing the response further comprises normalizing Hypertext Transfer Protocol (HTTP) head information and HTTP tag information.

According to some embodiment, the step of optimizing the response further comprises providing a Keep-alive connection to the terminal device.

According to some embodiment, the step of optimizing the response further comprises avoiding an @import operation of the CSS.

According to some embodiment, the step of optimizing the response further comprises replacing long time running JavaScript with web worker to be embedded in webpage script.

According to some embodiment, a computer-implemented method, performed by a substitute server system having one or more substitute servers and memory storing one or more programs for execution by the one or more substitute servers, the method comprising: retrieving a web page from a network server; applying a set of testing criteria to the web page if the web page satisfies a predefined condition; generating a set of protection rules for the web page based on a result of applying the set of testing criteria to the web page; and screening requests to access the web page in accordance with the set of protection rules.

According to some embodiment, the method further comprises updating the set of protection rules with newly generated protection rules.

According to some embodiment, the method further retrieving from the requests to access the web page information related to each field of the protection rules; comparing the retrieved information with the protection rules; if the retrieved information violates the protection rule, rejecting the requests to access the web page; if the retrieved information does not violate the protection rule, forwarding the requests to access the web page to the network server.

According to some embodiment, a substitute server system, comprising one or more processors and memory storing one or more programs for execution by the one or more processors, the system comprises a web page retriever configured to retrieve a web page from a network server; a web page processor configured to apply a set of testing criteria to the web page, and retrieve status information of the web page; a web page database configured to cache the web page information; a protection rule manager configured to generate a set of protection rules for the web page based on a result of applying the set of testing criteria to the web page; a protection rule database configured to store the set of protection rules; a access request processor configured to process an access request from a terminal device, and retrieve information related to each field of the protection rules from the access request; and a determination processor configured to compare the access request with the protection rules, and determine whether to forward or reject the access request.

According to some embodiment, a non-transitory computer readable storage medium, storing one or more programs for execution by one or more processors of a substitute server system, the one or more programs including instructions for: retrieving a web page from a network server; applying a set of testing criteria to the web page if the web page satisfies a predefined condition; generating a set of protection rules for the web page based on a result of applying the set of testing criteria to the web page; and screening requests to access the web page in accordance with the set of protection rules.

BRIEF DESCRIPTION OF THE DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

Like reference numerals refer to corresponding parts throughout the drawings.

DESCRIPTION OF EMBODIMENT

Reference will now be made in detail to embodiment, examples of which are illustrated in the accompanying drawings. While particular embodiments are described, it will be understood it is not intended to limit the invention to these particular embodiment. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiment.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiment only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Figure 1:
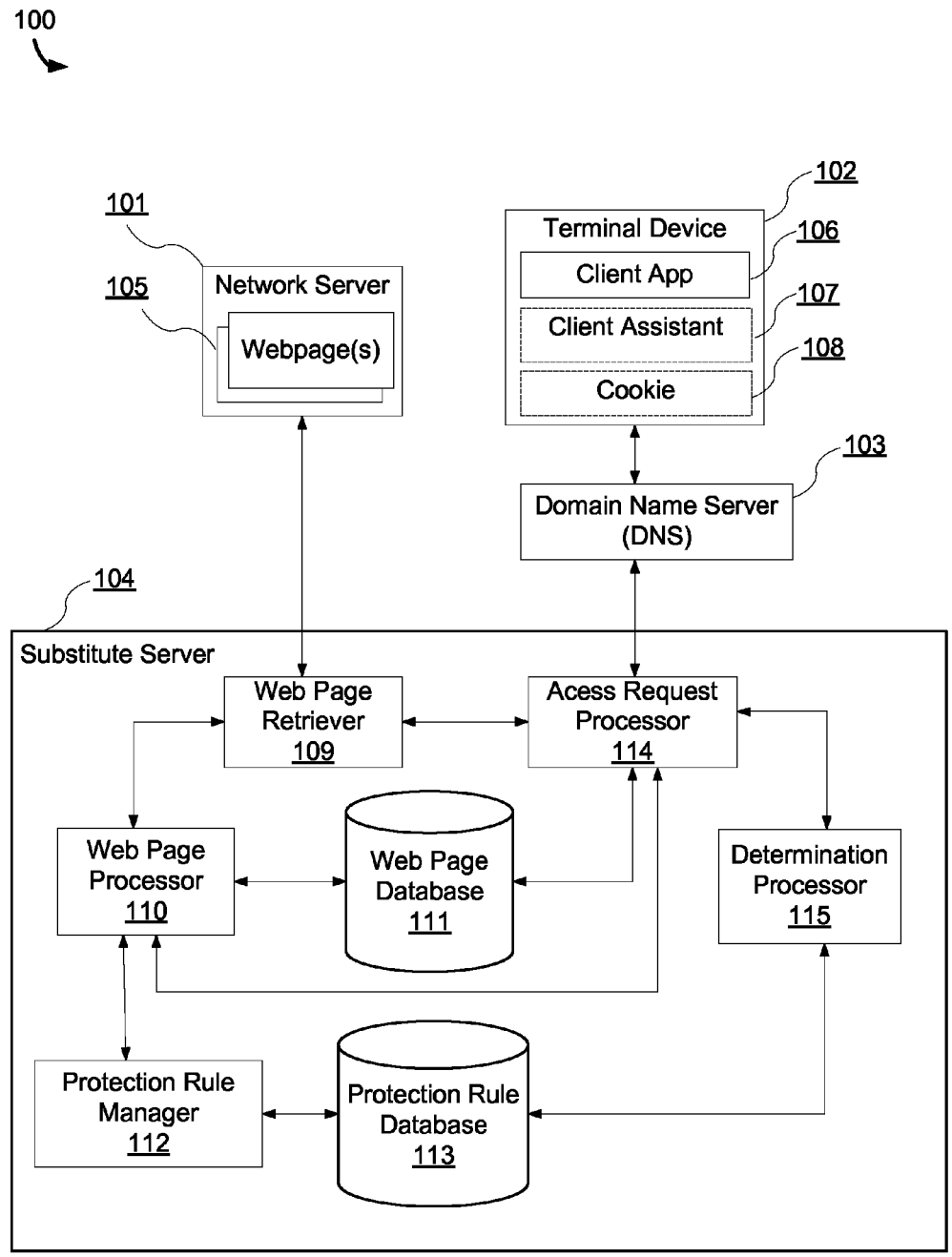
FIG. 1 is a block diagram of a substitute server screening data access requests from a terminal device to a network server in accordance with some embodiments of the present application.

FIG. 1 is a block diagram of a substitute server screening data access requests from a terminal device to a network server in accordance with some embodiments of the present application. The network system 100 generally includes a network server 101, one or more terminal devices 102, a domain name server (DNS), and one or more substitute servers 104. The network server 101 stores and maintains a plurality of web pages 105 and provides them to terminal devices 102 upon receipt of access request from the terminal devices 102. Each terminal device 102 includes various client applications 106 (e.g., a web browser), a client assistant program 107, one or more cookies 108 associated with different network servers, etc. A DNS is configured to associate domain names with networking equipment such as the network server 101 or the substitute server 104. The substitute server 104 includes a web page retriever 109, a web page processor 110, a web page database 111, a protection rule manager 112, a protection rule database 113, an access request processor 114, and a determination processor 115.

Within the substitute server 104, the web page retriever 109 periodically retrieves a web page from the network server 101; the web page processor 110 then processes the web page and generates a profile for the web page including its status information. In some embodiments, the web page processor 110 retrieves a current MD5 value of the web page, and compares the current MD5 value with a cached MD5 value of a previous version of the web page stored in the web page database 111. If the current MD5 value does not match the cached MD5 value, the web page processor 110 determines that the retrieved web page is a newly updated version, and stores the newly-retrieved web page in the web page database 111 and updates the cached MD5 value of the web page in the web page database 111 with the current MD5 value. Because the source code of a web page may contain security loopholes that can be used by hackers for launching malicious attacks to the network server, the web page processor 110 applies a set of testing criteria to the retrieved web page if the web page satisfies a predetermined condition. The protection rule manager 112 then generates a set of protection rules for the web page based on a result of applying the set of testing criteria to the web page. There are different sources for the security loopholes in the source code of a web page. For example, a web page may have a security loophole if it does not include logic for validating the data entries provided by an end user data or the information carried therein such as cookies. Once sniffed out, a hacker may take advantage of such security loophole in the source code of a web page to attack the network server.

For illustrative purposes, an exemplary security loophole in the source code of a web page for user login interface is illustrated in detail herein below:

```
<%
    String num=new String( );
    num=request.getParameter("num");
    String psw=new String( );
    psw=request.getParameter("psw");
    Connection con=null;
    Statement sql=null;
    ResultSet rs=null;
    try {Class.forName("sun.jdbc.odbc.JdbcOdbcDriver"); }
        catch(ClassNotFoundException e) { }
    try{con=DriverManager.getConnection("jdbc:odbc:sun","sa","password");
        sql=con.createStatement( );
        String condition="select * from studentInfo where sid= "+""+num+""+" and psw= "+""+psw+"";
        rs=sql.executeQuery(condition);
        if(rs.next( )==false)
            {out.println("Your username or password does not match! You are currently a visitor!");}
        else {out.println("Welcome,"+rs.getString("name"));}
        con.close( );
        }
    catch(SQLException e1){ }
%>
```

Note that the source code above does not check the type of the user-provided data and the length of a user-provided text string, which could be a username or a password. Nor does the source code check whether the user enters any special characters in a user input area of the web page. When this web page is published by a web server, a hacker can check whether the source code checks the type of data and the length of a string in the user input area. After identifying such security loophole, the hacker can enter "1' or 1=1--" in the username box and any data in the password box in the web page and submit a login request including the faked username and password to the network server 101. Without the substitute server 104, the login request can reach the network server 101 directly. Assuming that the network server 101 has access to the student information database of a university. Upon receipt of the login request, the network server 101 may then execute an SQL query against its student information database as follows:

"select * from studentInfo where sid='1' or 1=1"

As a result, a response to the SQL query including many usernames and passwords in the table "studentInfo" of the student Information Database will be returned to the hacker. In some embodiments, in order to detect and prevent such security loopholes, the web page processor 110 applies a set of testing criteria to the web page before its publication, which may include but not limited to the following criteria:

whether the web page corresponds to a protected URL;
what is the type of access request;
what are the type and number of variables; and
what is the length of each variable.

Based on a result of applying the set of testing criteria to the web page, the protection rule manager 112 generates a set of protection rules for the web page and stores the set of protection rules in the protection rule database 113. For example, the protection rules based on the testing criteria set forth above may be:

| | |
|---|---|
| Protected URL | URL=/login.jsp |
| Type of request | action=post |
| Type and number of variables | two variables, num and psw, wherein num is composed of digital characters '0'-'9' and psw is composed of alphanumerical characters '0'-'9' or 'a'-'z' or 'A'-'Z' |
| Length of a variable | the length of num is set to be 6 characters and the length of psw is set to be 6-8 characters |

The access request processor 114 forwards a request to access a web page in the network server 101 to the determination processor 115, which is configured to screen the request in accordance with a set of protection rules associated with the web page. For example, the determination processor 115 analyzes the access request, and determines whether the URL, the type of request, the type and number of variables, and the length of a variable associated with the access request satisfy one or more predetermined conditions defined by the protection rules. If the access request violates any of the protection rules, the determination processor 115 sends an instruction to the access request processor 114, which then denies the access request from the terminal device 102.

If the access request satisfies all predetermined conditions defined by the protection rules, the determination processor 115 sends an instruction to the access request processor 114 to process the access request. The access request processor 114 then searches the web page database 111, and determines whether the access request matches a cached record, i.e., a stored web page. If the access request matches a cached record, the access request processor 114 retrieves the stored web page information, and returns the web page information to the terminal device 102. If the access request does not match any cached record, the access request processor 114 forwards the access request to the web page retriever 109. The web page retriever 109 analyzes the access request, and obtains a web page address that the terminal device 102 requests to access. The web page retriever 109 then retrieves the requested web page information from the network server 101, and forwards the retrieved web page information to the web page processor 110 for further processing. The web page processor 110 optimizes the retrieved web page information, and sends the optimized web page information to the access request processor 114. The access request processor 114 then returns the optimized web page information to the terminal device 102. Meanwhile, the web page processor 110 creates a new record in the web page database 111, and updates the web page database 111 with the optimized web page information.

In some embodiments, the protection rules are maintained in the protection rule database 113. After the network server 101 releases a new web page or updates an existing web page, the web page processor 110 checks whether the web page includes any security loopholes. For those identified loopholes, the protection rule manager 112 generates a set of new protection rules and updates the protection rule database 113 to include the new protection rules.

Figure 2:
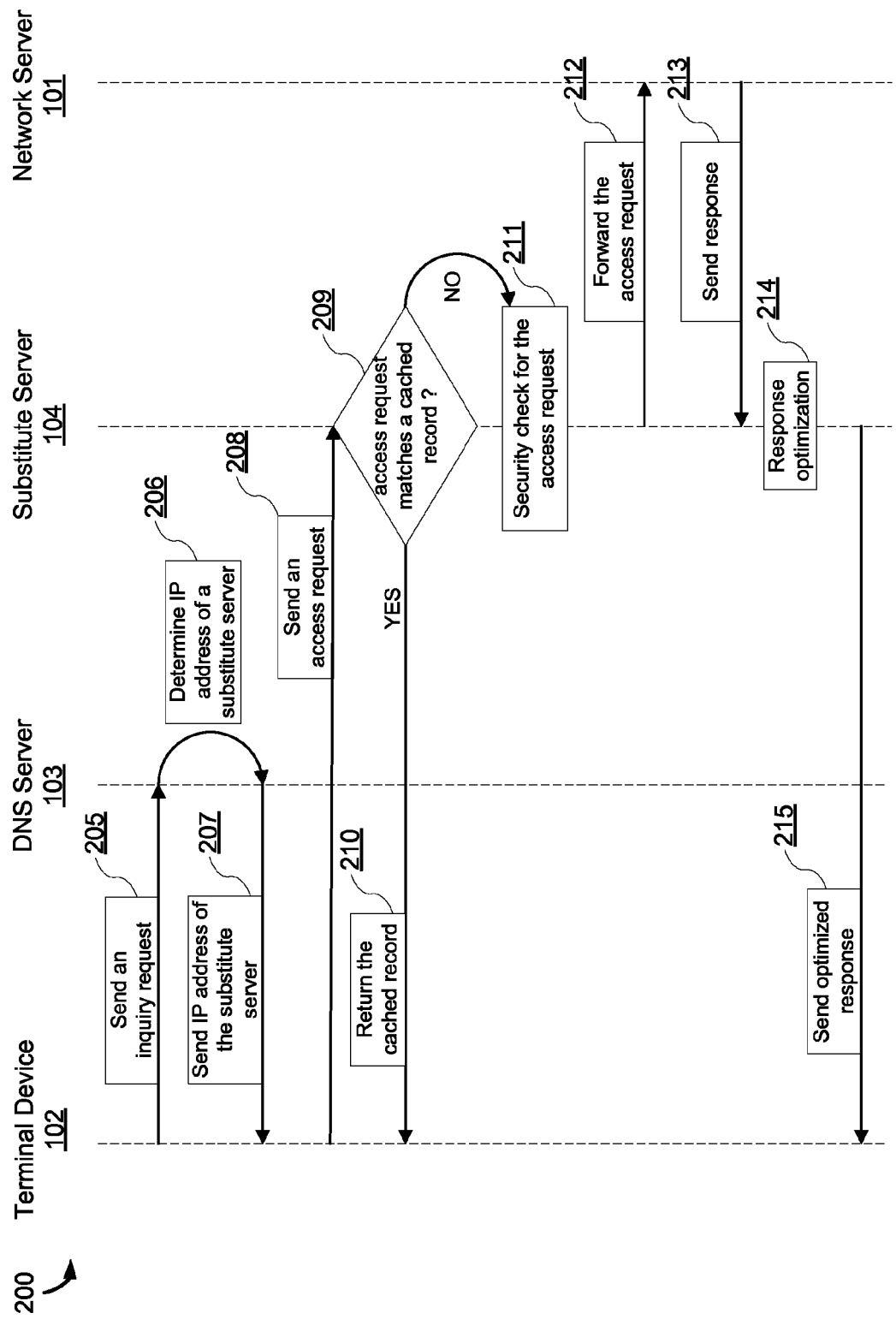
FIG. 2 is a flow diagram illustrating an exemplary data exchange process involving a terminal device, a DNS server, a substitute server, and a network server in accordance with some embodiments of the present application.

FIG. 2 is a flow diagram illustrating an exemplary data exchange process involving a terminal device, a DNS server, a substitute server, and a network server in accordance with some embodiments of the present application. A terminal device 102 sends an access request to a DNS server 103 (step 205). The DNS server 103 determines the IP address of a substitute server 104 (step 206), and returns the IP address of the substitute server 104 to the terminal device 102 (step 207). Upon receipt of the IP address of the substitute server 104, the terminal device 102 sends the substitute server 104 an access request (step 208). In some embodiments, the terminal device 102 maintains the IP address of the substitute server 104 in its memory so that it does not need to query the DNS server 103 for the IP address. The substitute server 104 determines whether the access request matches a cached record (e.g., a web page) stored in the substitute server (step 209). In some embodiment, the substitute server 104 extracts a web page address from the access request, and compares the web page address with the cached records stored in the substitute server 104. If the cached record is found, the substitute server 104 returns the cached record 210 to the terminal device 102 (step 210). If no cached record is found, the substitute server 104 processes the access request for security check (step 211). If the access request passes the security check, the substitute server 104 forwards the processed access request to the network server 101 (step 212). Upon receipt of the access request, the network server 101 returns a response to the substitute server 104 with requested information such as a web page (step 213). The substitute server 104 optimizes the response including the returned web page (step 214), and forwards the optimized response to the requesting terminal device 102 (step 215).

In some embodiments, the security check performed by the substitute server 104 includes but not limited to the following items:

- detect whether the access request includes an illegal component;
- detect whether the access request includes a Structured Query Language (SQL) injection; and
- detect whether the access request includes a Cross Site Scripting (XSS) injection.

In some embodiments, the optimization of the web page information performed by the substitute server 104 includes but not limited to the following items:

- configure a Time To Live (TTL) for a web page maintained in the network server; for example, configure the TTL of the web page to be one week by default if the TTL of the webpage is shorter than one week;
- defer the loading of a JavaScript that does not affect rendition of the web page;
- compress the Cascading Style Sheets (CSS)/JavaScript, and adjust the positions of CSS and JavaScript in the web page;
- perform a lossless compression of an image, and normalize the size of the image;
- normalize the Hypertext Transfer Protocol (HTTP) header information and the HTTP tag information;
- provide a Keep-alive connection to the terminal device 102;
- avoid an @import operation of the CSS; and
- replace a long-time running JavaScript with a web worker to be embedded in the web page.

Figure 3:
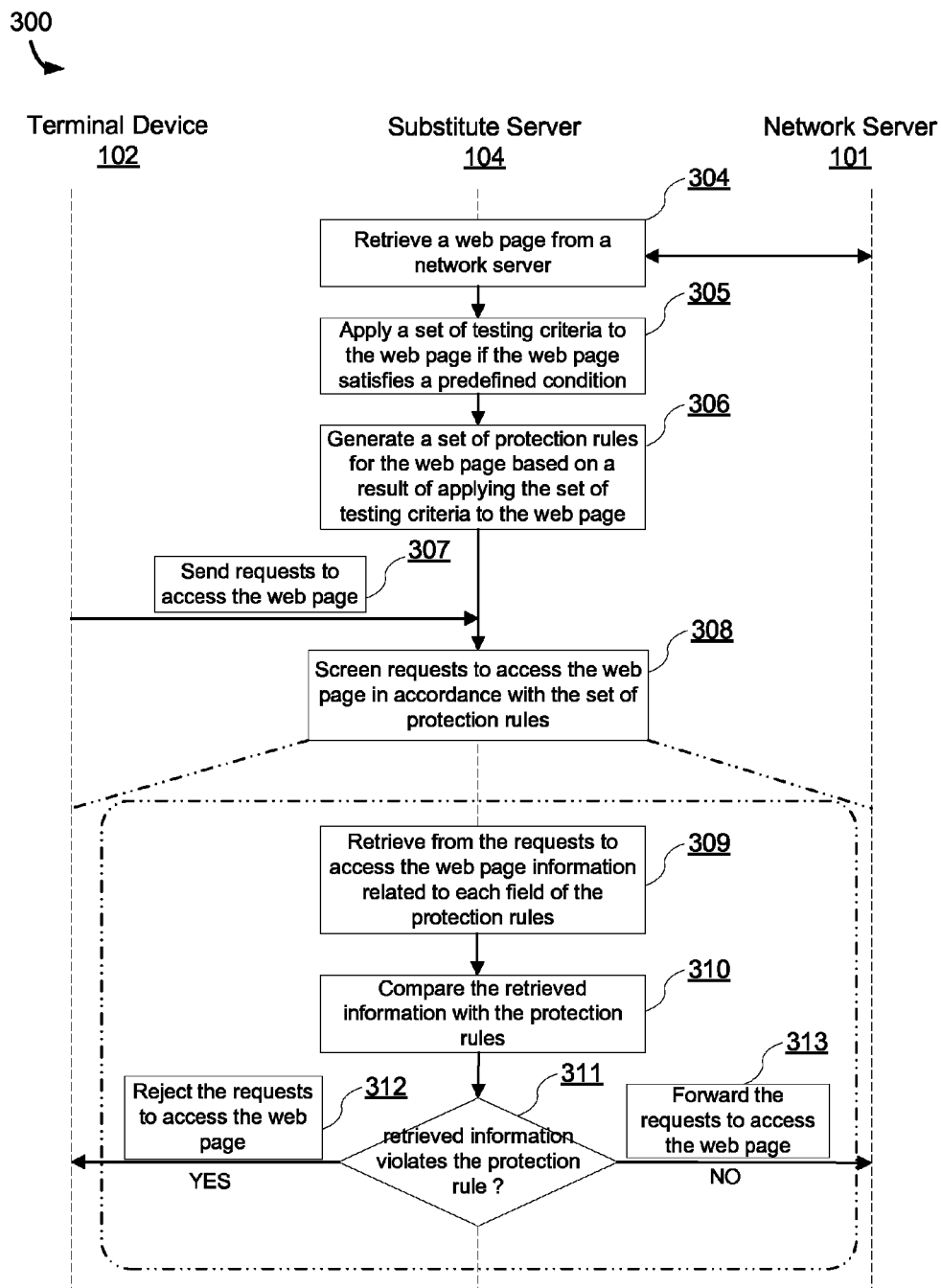
FIG. 3 is a flow diagram illustrating an exemplary process performed the substitute server in accordance with some embodiments of the present application.

FIG. 3 is a flow diagram illustrating an exemplary process performed the substitute server in accordance with some embodiments of the present application. The substitute server 104 retrieves a web page from the network server 101 (step 304) and applies a set of testing criteria to the web page if the web page satisfies a predefined condition (step 305). The substitute server 104 generates a set of protection rules for the web page based on a result of applying the set of testing criteria to the web page (step 306) and, upon receipt of access requests to access the web page from a terminal device 102 (step 307), screens the access requests in accordance with the set of protection rules (step 308).

In some embodiment, the step of screening the access requests in accordance with the set of protection rules (step 308) performed at the substitute server 104 further includes retrieving from the access requests the web page information related to each field of the protection rules (step 309); comparing the retrieved information with the protection rules (step 310); determining whether the retrieved information violates the protection rules (step 311); if the retrieved information violates any protection rule, rejecting the access requests to access the web page (step 312); and if the retrieved information satisfies the protection rules, forwarding the access requests to access the web page to the network server 101 (step 313).

In some embodiment, a non-transitory computer readable storage medium, storing one or more programs for execution by one or more processors of a substitute server system, the one or more programs including instructions for: retrieving a web page from a network server; applying a set of testing criteria to the web page if the web page satisfies a predefined condition; generating a set of protection rules for the web page based on a result of applying the set of testing criteria to the web page; and screening requests to access the web page in accordance with the set of protection rules.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. For example, it is possible for the set top box to send raw audio signal to the TV content recognition server, which is then responsible for converting the audio signal into audio fingerprints. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method, performed by a substitute server system including one or more servers and memory storing one or more programs for execution by the one or more servers, the method comprising:
at the substitute server system:
receiving an access request from a terminal device to a network server distinct from the substitute server system;
extracting a web page address from the access request and comparing the web page address with cached records stored in the substitute server system;
determining whether the access request matches a cached record stored in the substitute server system;
in accordance with a determination that the access request matches a cached record stored at the substitute server system,
returning the matched cached record to the terminal device;
in accordance with a determination that the access request does not match a cached record stored at the substitute server system,
processing the access request for a security check, further including detecting whether the access request includes an illegal access request;
in accordance with the security check, forwarding the processed access request to the network server;
receiving a response satisfying the access request, the response including information from the web page, from the network server;
optimizing the response from the network server; and
forwarding the optimized response to the terminal device.

2. The method of claim 1, wherein the security check further comprises:
detecting whether the access request includes a Structured Query Language (SQL) injection.

3. The method of claim 1, wherein the security check further comprises:
detecting whether the access request includes a Cross Site Scripting (XSS).

4. The method of claim 1, wherein the step of optimizing the response further comprises:
configuring a Time To Live (TTL) for a web page maintained in the network server;
if the TTL of the webpage is shorter than one week, configuring the TTL of the web page to one week by default.

5. The method of claim 1, wherein the step of optimizing the response further comprises:
deferring the loading of a JavaScript that does not affect web page rendering.

6. The method of claim 1, wherein the step of optimizing the response further comprises:
compressing Cascading Style Sheets (CSS)/JavaScript, and
adjusting positions of CSS and JavaScript.

7. The method of claim 1, wherein the step of optimizing the response further comprises:
compressing an image without loss, and
normalizing the size of an image.

8. The method of claim 1, wherein the step of optimizing the response further comprises:
normalizing Hypertext Transfer Protocol (HTTP) head information and HTTP tag information.

9. The method of claim 1, wherein the step of optimizing the response further comprises:
providing a Keep-alive connection to the terminal device.

10. The method of claim 1, wherein the step of optimizing the response further comprises:
avoiding an @import operation of the CSS.

11. The method of claim 1, wherein the step of optimizing the response further comprises:
replacing long time running JavaScript with web worker to be embedded in webpage script.

12. The method of claim 1, wherein determining whether the access request matches a cached record stored in the substitute server system further comprises:
determining whether a current version identifier corresponding to the cached record matches a cached version identifier corresponding to the cached record.

13. The method of claim 12, wherein:
the current version identifier is an MD5 value of a first web page stored on the network server; and
the cached version identifier is an MD5 value of a second web page stored on the substitute server system.

14. The method of claim 1, further comprising:
retrieving a webpage from the network server;
applying a set of testing criteria to the web page if the web page satisfies a predefined condition; and
generating a set of protection rules for the web page based on a result of applying the set of testing criteria to the web page; and
caching a record of the web page.

* * * * *